(12) United States Patent  
Araki et al.

(10) Patent No.: US 12,348,108 B2  
(45) Date of Patent: Jul. 1, 2025

(54) ROTATING ELECTRIC MACHINE COOLING FRAME AND METHOD OF MANUFACTURING ROTATING ELECTRIC MACHINE COOLING FRAME

(71) Applicants: Toshiba Industrial Products and Systems Corporation, Kawasaki (JP); KAWAMATA SEIKI CO., LTD., Date-gun (JP)

(72) Inventors: Takashi Araki, Mie-gun (JP); Toshiaki Hirate, Mie-gun (JP); Motoyasu Mochizuki, Mie-gun (JP); Masaaki Matsumoto, Mie-gun (JP); Ryou Tamura, Date-gun (JP); Hiroyasu Fukuhara, Date-gun (JP)

(73) Assignees: Toshiba Industrial Products and Systems Corporation, Kawasaki (JP); KAWAMATA SEIKI CO., LTD., Date-gun (JP)

( * ) Notice: Subject to any disclaimer, the term of this patent is extended or adjusted under 35 U.S.C. 154(b) by 196 days.

(21) Appl. No.: 18/006,064

(22) PCT Filed: Jun. 14, 2021

(86) PCT No.: PCT/JP2021/022526  
§ 371 (c)(1),  
(2) Date: Jan. 19, 2023

(87) PCT Pub. No.: WO2022/019003  
PCT Pub. Date: Jan. 27, 2022

(65) Prior Publication Data  
US 2023/0291271 A1 Sep. 14, 2023

(30) Foreign Application Priority Data  
Jul. 22, 2020 (JP) .................. 2020-125583

(51) Int. Cl.  
*H02K 5/20* (2006.01)  
*H02K 9/19* (2006.01)

(52) U.S. Cl.  
CPC ............... *H02K 5/203* (2021.01); *H02K 9/19* (2013.01)

(58) Field of Classification Search  
CPC .................. H02K 5/203; H02K 9/19  
See application file for complete search history.

(56) References Cited

U.S. PATENT DOCUMENTS 2,571,872 A * 10/1951 Hayes .................. H02K 5/203  
174/15.1  
2010/0176668 A1 7/2010 Murakami et al.  
(Continued)

FOREIGN PATENT DOCUMENTS

DE 102007035271 A1 * 1/2009 ............... H02K 5/20  
DE 102014209176 A1 * 11/2015 ............... H02K 5/02  
(Continued)

OTHER PUBLICATIONS

International Search Report issued Aug. 24, 2021 in PCT/JP2021/022526, filed on Jun. 14, 2021, 4 pages (with English Translation).  
(Continued)

*Primary Examiner* — Mohamad A Musleh  
(74) *Attorney, Agent, or Firm* — Oblon, McClelland, Maier & Neustadt, L.L.P.

(57) ABSTRACT

A rotating electric machine cooling frame according to an embodiment includes: a cylindrical frame main body; one cooling-medium inlet provided on the frame main body; one cooling-medium outlet provided on the frame main body; and a plurality of flow-passage lines provided in the frame main body, including a cooling-medium flow passage in communication with the cooling-medium inlet and the cooling-medium outlet.

5 Claims, 4 Drawing Sheets

(56) References Cited

U.S. PATENT DOCUMENTS

2014/0246933 A1     9/2014    Chamberlin
2017/0085149 A1*   3/2017    Osterlaenger ............ H02K 7/14

FOREIGN PATENT DOCUMENTS

| DE | 102018121203 A1 * | 3/2020 | ............ H02K 5/203 |
|----|---|---|---|
| EP | 2 731 236 A2 | 5/2014 | |
| EP | 2 940 835 B1 | 6/2019 | |
| JP | 2010-166710 A | 7/2010 | |
| JP | 2016-39726 A | 3/2016 | |
| JP | 2016-144270 A | 8/2016 | |
| JP | 2021151060 A * | 9/2021 | |
| WO | WO 2020/043602 A1 | 3/2020 | |
| WO | WO-2021157242 A1 * | 8/2021 | ............... H02K 5/06 |

OTHER PUBLICATIONS

Extended European Search Report Issued Aug. 12, 2024 in European Application 21845333.0, 10 pages.

\* cited by examiner

ROTATING ELECTRIC MACHINE COOLING FRAME AND METHOD OF MANUFACTURING ROTATING ELECTRIC MACHINE COOLING FRAME

TECHNICAL FIELD

Embodiments of the present invention relate to a rotating electric machine cooling frame and a method of manufacturing a rotating electric machine cooling frame.

BACKGROUND ART

For example, a drive unit used for a hybrid automobile including an engine and an electric motor serving as a rotating electric machine mounted therein is known. As a configuration of such a drive unit, a configuration is considered in which structural members (a stator, a rotor, or the like) of the rotating electric machine (electric motor) are housed and unitized in an inner-periphery portion of a cylindrical rotating electric machine frame. The drive unit including such a rotating electric machine unit may have a structure that supplies cooling water for cooling to an inside of the rotating electric machine frame to prevent heating depending on the drive of the rotating electric machine. With this configuration, since the rotating electric machine frame is cooled down, it is possible to cool down the rotating electric machine.

Here, it is possible to form, by machining, a flow passage that causes cooling water to flow to the inside of the rotating electric machine frame. As a configuration of the rotating electric machine frame, a separable configuration may be adopted in which the rotating electric machine frame is separated into a plurality of members. For example, as a configuration of the rotating electric machine frame, a separable configuration is adopted in which a cylindrical frame main body and a ring-shaped seal member disposed at an end portion of the frame main body in the axial direction are separable from each other.

With this configuration, a plurality of through-holes that penetrate through the frame main body in the axial direction are formed on the frame main body. The plurality of the through-holes are arranged side by side in the circumferential direction. The seal member is provided so as to block openings of the plurality of the through-holes. Recess portions that cause the through-holes adjacent to each other in the circumferential direction to be in communication therewith are formed in the seal member. In the rotating electric machine frame having the above-described configuration, the plurality of the through-holes formed on the frame main body by carrying out machining thereto are in communication therewith, and it is possible to spread cooling water over the entirety of the frame main body.

However, the temperature of the cooling water gradually increases depending on the flow of the cooling water into the plurality of the through-holes, and there is a possibility that temperature irregularity over the entirety of the rotating electric machine frame occurs. Accordingly, there is a possibility that the rotating electric machine cannot be sufficiently cooled down by the rotating electric machine frame.

CITATION LIST

Patent Literature

[Patent Literature 1] Japanese Unexamined Patent Application, First Publication No. 2016-144270

SUMMARY OF THE INVENTION

Problems to be Solved by the Invention

The invention that solves the problem provides a rotating electric machine cooling frame and a method of manufacturing a rotating electric machine cooling frame which can effectively cool down a rotating electric machine.

Means for Solving the Problems

A rotating electric machine cooling frame according to an embodiment includes: a cylindrical frame main body; one cooling-medium inlet provided on the frame main body; one cooling-medium outlet provided on the frame main body; and a plurality of flow-passage lines provided in the frame main body, including a cooling-medium flow passage in communication with the cooling-medium inlet and the cooling-medium outlet.

EMBODIMENTS FOR CARRYING OUT THE INVENTION

Hereinafter, a rotating electric machine cooling frame and a method of manufacturing a rotating electric machine cooling frame according to an embodiment will be described with reference to the drawings.

Figure 1:
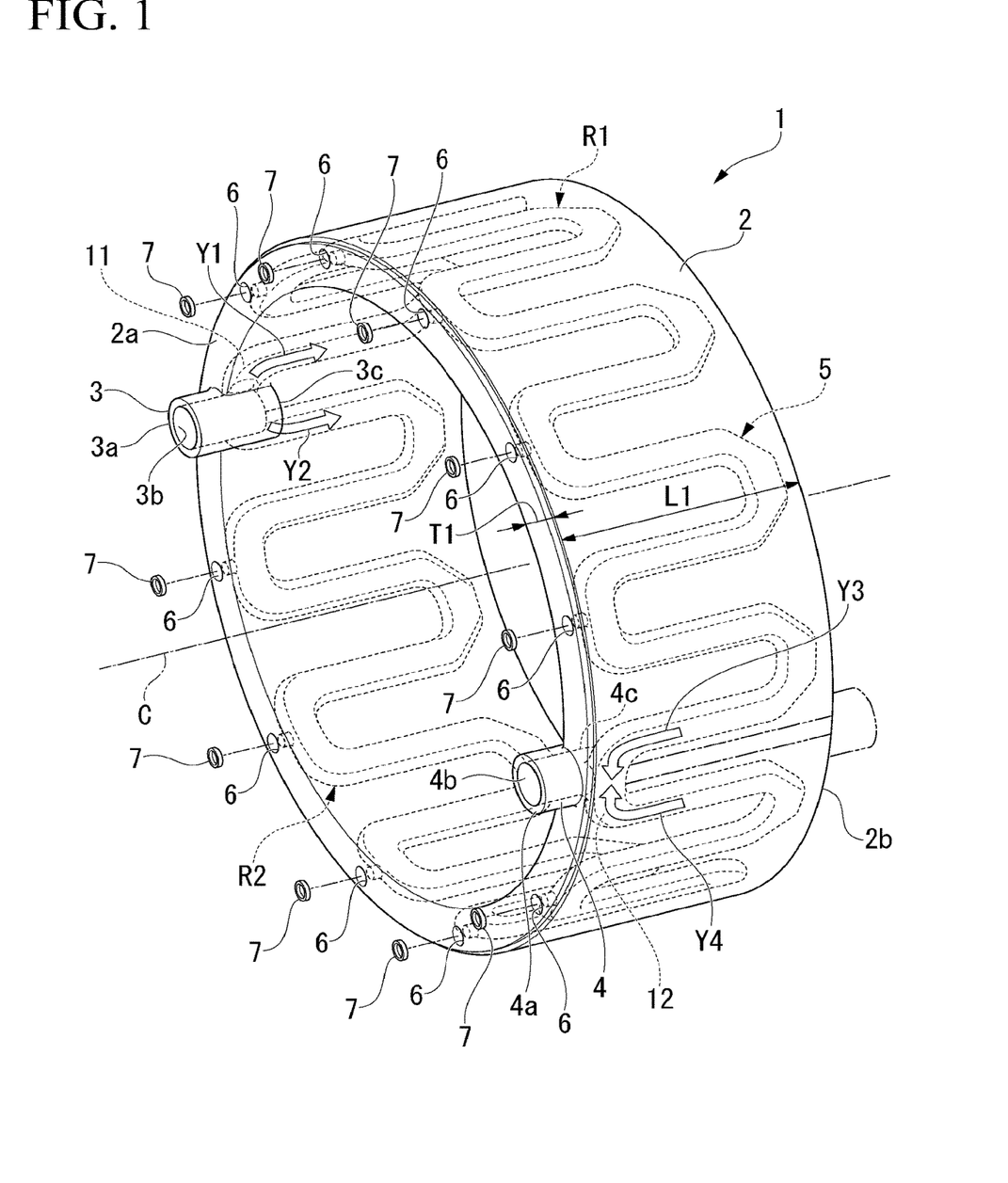
FIG. 1 is a perspective view showing a rotating electric machine cooling frame according to an embodiment.

FIG. 1 is a perspective view showing a rotating electric machine cooling frame 1.

The rotating electric machine cooling frame 1 accommodates a rotating electric machine (a stator and a rotor), which is not shown in the drawings.

As shown in FIG. 1, the rotating electric machine cooling frame 1 includes: a circular-cylindrical frame main body 2, a water inlet 3 (an example of a cooling-medium inlet) provided on the frame main body 2, a water outlet 4 (an example of a cooling-medium outlet), and a water flow passage 5 (an example of a cooling-medium flow passage) formed in the frame main body 2.

Note that, in the following description, an axial direction of the frame main body 2 is simply referred to as an axial direction, a radial direction of the frame main body 2 is simply referred to as a radial direction, and a circumferential direction of the frame main body 2 is simply referred to as a circumferential direction.

The frame main body 2 is made of, for example, an aluminum alloy, by casting. Note that, a method of casting the frame main body 2 will be described below in detail. For example, an outer-peripheral surface of a stator, which is not shown in the drawings, is fitted onto an inner-peripheral surface of the frame main body 2. A length L1 in the axial direction of the frame main body 2 is a sufficient length for fitting and fixing a stator, which is not shown in the drawings, into the frame main body 2. A thickness T1 in the radial direction of the frame main body 2 is a sufficient thickness for forming the water flow passage 5 in the frame main body 2. The frame main body 2 has a first end portion 2a (first edge surface) and a second end portion 2b (second edge surface) located on the opposite side of the first end portion 2a in the axial direction of the frame main body 2.

The water inlet 3 and the water outlet 4 are integrally molded on the first end portion 2a in the axial direction of the frame main body 2. The water inlet 3 and the water outlet 4 are formed along the axial direction. The water inlet 3 has a front-end 3a, an opening portion 3b formed at the front-end 3a, and a base end 3c on the opposite side of the front-end 3a. The water outlet 4 has a front-end 4a, an opening portion 4b formed at the front-end 4a, and a base end 4c on the opposite side of the front-end 4a. The opening portions 3b and 4b face the same direction. Furthermore, the water inlet 3 and the water outlet 4 are disposed to face each other so as to sandwich a central axis C of the frame main body 2. In other words, a straight line connecting the water inlet 3 and the water outlet 4 intersects with the center (central axis C) in the radial direction of the frame main body 2.

Moreover, a plurality of holes 6 are formed on the first end portion 2a of the frame main body 2 in the axial direction. The plurality of the holes 6 are disposed at an equal distance in the circumferential direction. The plurality of the holes 6 are in communication with the water flow passage 5. A plurality of caps 7 are provided on the rotating electric machine cooling frame 1. Each of the plurality of the caps 7 is inserted into the hole 6 from the outside of the rotating electric machine cooling frame 1 in the axial direction. Consequently, the caps 7 block the holes 6. The caps 7 are fixed on the frame main body 2.

Figure 2:
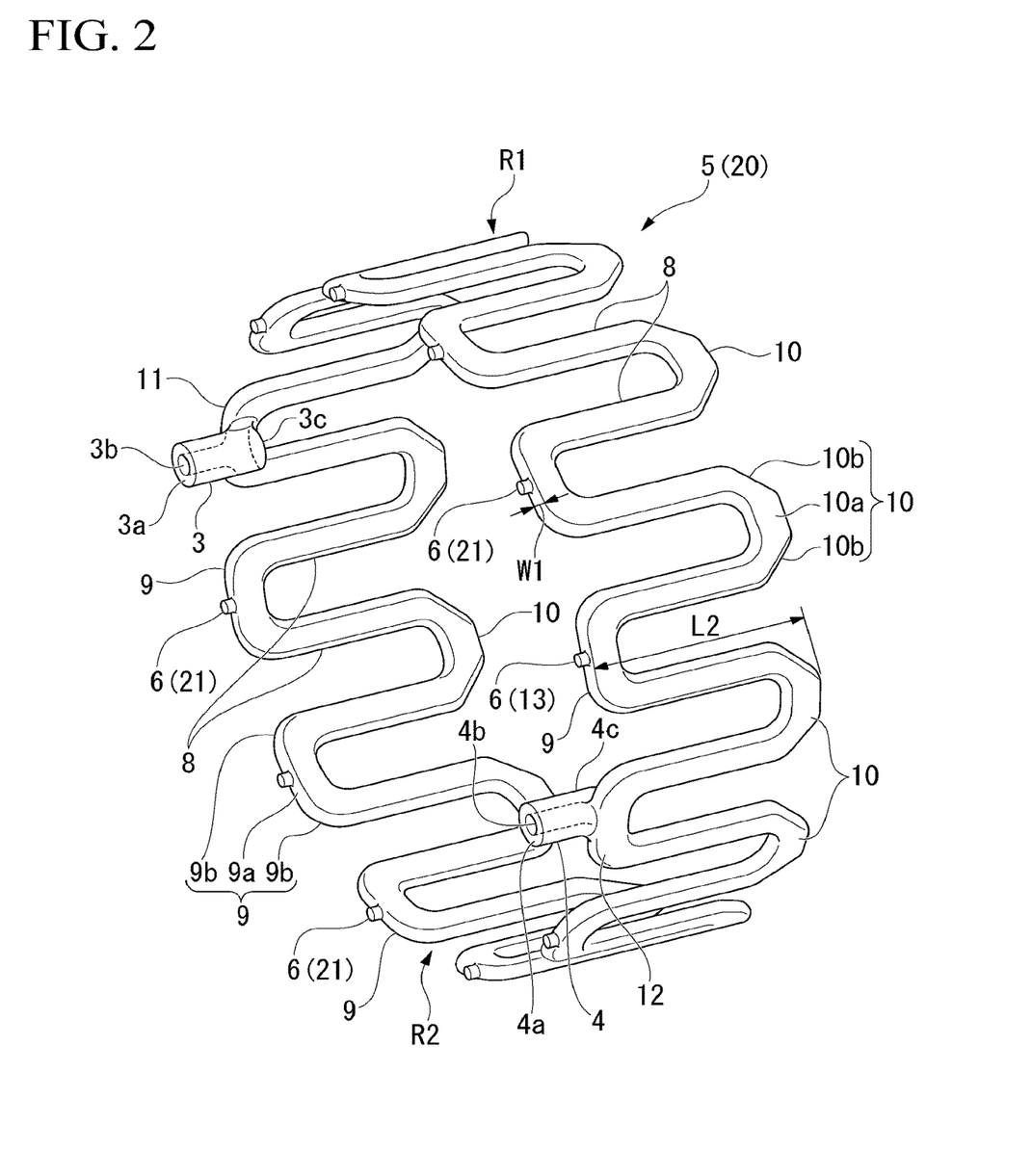
FIG. 2 is a perspective view showing a water flow passage according to the embodiment.

FIG. 2 is a perspective view showing the water flow passage 5.

As shown in FIGS. 1 and 2, a branch flow passage 11, a converging flow passage 12, and two water flow passages 5 (two flow-passage lines) are provided inside the frame main body 2 between the water inlet 3 and the water outlet 4. Each of the water flow passages 5 is formed over the entirety of the frame main body 2 while meandering so as to be turned back at both ends of the frame main body 2 in the axial direction. Each of the water flow passages 5 includes a plurality of straight flow passages 8, a plurality of first connection flow passages 9, and a plurality of second connection flow passages 10.

A series flow passage, in which the plurality of the straight flow passages 8, the plurality of the first connection flow passages, and the plurality of the second connection flow passages 10 are connected in series, forms one flow-passage line. Furthermore, the frame main body 2 includes the branch flow passage 11 that branches a flow passage and the converging flow passage 12 that converges the branched flow passages. Therefore, a plurality of flow-passage lines are provided inside the frame main body 2. In the embodiment, two flow-passage lines are provided.

The plurality of the straight flow passages 8 extend in the axial direction of the frame main body 2. The plurality of the straight flow passages 8 are disposed at an equal distance in the circumferential direction. In the axial direction, each of the plurality of the straight flow passages 8 has a first flow passage end and a second flow passage end. The first flow passage end is located close to the first end portion 2a and inside the frame main body 2. The second flow passage end is located close to the second end portion 2b and inside the frame main body 2.

Each of the plurality of the first connection flow passages 9 connects two straight flow passages 8 adjacent to each other in the circumferential direction. The portion at which the first connection flow passage 9 and the straight flow passage 8 are connected is a circular-arc flow passage 9b described below.

Each of the plurality of the second connection flow passages 10 connects the two straight flow passages 8 adjacent to each other in the circumferential direction. The portion at which the second connection flow passage 10 and the straight flow passage 8 are connected is an inclined surface 10b formed at the second connection flow passage described below.

The branch flow passage 11 is formed at the base end 3c on the opposite side of the front-end 3a of the water inlet 3. The branch flow passage 11 is disposed at a position close to the first end portion 2a in the axial direction of the frame main body 2 and at a position directly under the water inlet 3.

The converging flow passage 12 is formed at the base end 4c on the opposite side of the front-end 4a of the water outlet 4. The converging flow passage 12 is disposed at a position close to the first end portion 2a in the axial direction of the frame main body 2 and at a position directly under the water outlet 4. That is, in the embodiment, both the branch flow passage 11 and the converging flow passage 12 are disposed at positions close to the first end portion 2a of the frame main body 2.

For example, both the branch flow passage 11 and the converging flow passage 12 may be disposed at positions close to the second end portion 2b on the opposite side of the first end portion 2a.

For example, in a configuration in which the branch flow passage 11 is disposed at a position close to the first end portion 2a of the frame main body 2, the converging flow passage 12 may be disposed at a position close to the second end portion 2b of the frame main body 2. Even in this case, the water inlet 3 and the water outlet 4 are disposed to face each other so as to sandwich a central axis C of the frame main body 2. In other words, a straight line connecting the water inlet 3 and the water outlet 4 intersects with the center (central axis C) in the radial direction of the frame main body 2.

The flow passages 9 to 12 are in communication therewith in series in each of the two flow-passage lines.

Specifically, one first connection flow passage 9 is provided between the two straight flow passages 8 adjacent to each other, and the two straight flow passages 8 are in communication with one first connection flow passage 9. Similarly, one second connection flow passage 10 is provided between the two straight flow passages 8 adjacent to each other, and the two straight flow passages 8 are in communication with one second connection flow passage 10.

The branch flow passage 11 is in communication with the water inlet 3 and is in communication with the two straight flow passages 8 located next to the water inlet 3. The converging flow passage 12 is in communication with the water outlet 4 and is in communication with the two straight flow passages 8 located next to the water outlet 4.

The branch flow passage 11 is on the same plane as that of the first connection flow passage 9 disposed at the water inlet 3.

The converging flow passage 12 is on the same plane as that of the first connection flow passage 9 disposed at the water outlet 4.

The plurality of the first connection flow passages 9 are disposed so as to avoid the water inlet 3 and the water outlet 4. The plurality of the first connection flow passages 9 and the plurality of the second connection flow passages 10 are alternately disposed in the circumferential direction.

Furthermore, the first connection flow passage 9 includes: a lateral flow passage 9a extending in the circumferential direction, and the circular-arc flow passages 9b formed at both ends of the lateral flow passage 9a in the circumferential direction. A central portion of the lateral flow passage 9a in the circumferential direction is in communication with the hole 6.

The second connection flow passage 10 includes a lateral flow passage 10a extending in the circumferential direction. The inclined surfaces 10b having a shape such that the lateral flow passage 10a is flat-chamfered are formed at both ends of the lateral flow passage 10a in the circumferential direction.

In FIG. 2, a length L2 of the water flow passage 5 in the axial direction, that is, a total length of a length of one straight flow passage 8 in the axial direction, a width of one first connection flow passage 9 in the axial direction, and a width of one second connection flow passage 10 in the axial direction, is shorter than the length L1 of the frame main body 2 in the axial direction.

A width W1 of the water flow passage 5 in the radial direction is smaller than the thickness T1 of the frame main body 2 in the radial direction. Accordingly, the water flow passage 5 is accommodated in the frame main body 2 and is not exposed to the outside of the frame main body 2.

Next, a method of manufacturing the rotating electric machine cooling frame 1 will be described.

The rotating electric machine cooling frame 1 is manufactured by casting. The water flow passage 5 is formed using a core 20 serving as a sand mold. More specifically, firstly, the core 20 forming the water flow passage 5 is manufactured (core-manufacturing step). The shape of the core 20 corresponds to the shape of the water flow passage 5 shown in FIG. 2. The core 20 has projecting portions 21 forming the holes 6 (an example of a positioning-projecting portion, refer to FIG. 2).

Next, after the core 20 is manufactured, the core 20 is disposed in a mold, which is not shown in the drawings (core placement step). At this time, positioning of the core with respect to the mold is carried out using the projecting portions 21 of the core 20. That is, the projecting portions 21 function as positioning-projecting portions that carry out the positioning of the core 20 with respect to the mold.

Next, molten metal (for example, incited aluminum) is cast in the mold, which is not shown in the drawings. The molten metal is solidified in the mold and the frame main body 2 is manufactured (frame-manufacturing step). At this time, front-ends of the projecting portions 21 are exposed from the first end portion 2a (refer to FIG. 1) of the frame main body 2 in the axial direction. Because of this, the holes 6 are formed on the frame main body 2.

Next, after the frame main body 2 is cast, the core 20 is removed from the frame main body 2 (core removal step).

In the core removal step, firstly, the core 20 is roughly crushed by applying vibration to the frame main body 2 (rough crushing step). Consequently, a sand mold material (crushed product) forming the core 20 becomes agglomerations, particles, and powder dust.

Next, air is blown to the inside of the frame main body 2 (inside of the water flow passage 5) via holes 6 optionally selected from the plurality of the holes 6 formed on the frame main body 2 (first blowing step). Accordingly, the agglomerations, the particles, and the powder dust, which are the material forming the core 20, are discharged from holes 6 other than the hole 6 to which air is blown, the opening portion 3b of the water inlet 3, and the opening portion 4b of the water outlet 4. For this reason, the material forming the core 20 is removed from the frame main body 2. As stated above, the holes 6 of the frame main body 2 are formed to carry out the positioning of the core with respect to the mold. Furthermore, after the frame main body 2 is manufactured, the holes 6 of the frame main body 2 are utilized to remove the material forming the core from the inside of the frame main body 2.

Next, the agglomerations serving as remaining sand mold material of the core 20 (remaining material) which remains in the frame main body 2 becomes particulate by heating the frame main body 2 (heating step).

Next, air is again blown to the inside of the frame main body 2 (inside of the water flow passage 5) via holes 6 optionally selected from the plurality of the holes 6 formed on the frame main body 2 (second blowing step). For this reason, particles or powder dust which is the remaining sand mold material (remaining material) of the core is discharged from holes 6 other than the hole 6 to which air is blown, the opening portion 3b of the water inlet 3, and the opening portion 4b of the water outlet 4. Consequently, the core removal step is completed.

After the core removal step is completed, the holes 6 are blocked by the caps 7. Therefore, manufacture of the rotating electric machine cooling frame 1 is completed.

Next, the function of the rotating electric machine cooling frame 1 will be described.

A pipe, a hose pipe, or the like, which is not shown in the drawings, is connected to the water inlet 3 and the water outlet 4 of the rotating electric machine cooling frame 1. Subsequently, cooling water as a cooling medium is supplied to the water inlet 3 from such a pipe, a hose pipe, or the like. The cooling water supplied to the water flow passage 5 through the water inlet 3 is separated into the two straight flow passages 8 by the branch flow passage 11 and each flow to the two straight flow passages 8 (refer to arrows Y1 and Y2 in FIG. 1). After that, the cooling water flows to the plurality of the straight flow passages 8, the plurality of the first connection flow passages 9, and the plurality of the second connection flow passages 10, and the cooling water branched by the branch flow passage 11 is converged by the converging flow passage 12 (refer to arrows Y3 and Y4 in FIG. 1). Next, the converged cooling water is discharged via the converging flow passage 12 from the water outlet 4.

As mentioned above, the rotating electric machine cooling frame 1 includes the two water flow passages 5, that is, the two flow-passage lines. That is, the rotating electric machine cooling frame 1 includes a first flow-passage line R1 and a second flow-passage line R2.

In the first flow-passage line R1, the cooling water flows from the water inlet 3 in the direction shown by the arrow Y1, and the water passes through the water outlet 4 in the direction shown by the arrow Y3 and is discharged therefrom.

In the second flow-passage line R2, the cooling water flows from the water inlet 3 in the direction shown by the arrow Y2, and the cooling water passes through the water outlet 4 in the direction shown by the arrow Y4 and is discharged therefrom.

The holes 6 formed on the frame main body 2 are blocked by the caps 7. Accordingly, the water flowing to each of the flow passages 8 to 12 does not leak out from the frame main body 2. Additionally, the circular-arc flow passage 9b is formed at a connection portion (corner portion) at which the first connection flow passage 9 is connected to the straight flow passage 8. The inclined surface 10b is formed at a connection portion (corner portion) at which the second connection flow passage 10 is connected to the straight flow passage 8. Because of this, an increase in flow resistance can be reduced at each connection portion (corner portion), and the cooling water can smoothly flow over the entirety of each of the flow passages 8 to 12.

Moreover, the water flow passage 5 is formed over the entirety of the frame main body 2 while meandering so as to be turned back at both ends of the frame main body 2 in the axial direction. Therefore, the cooling water evenly spreads over the entirety of the frame main body 2. Also, the frame main body 2 has the two water flow passages 5 (two flow-passage lines).

Consequently, it is possible to shorten a length of the flow passages per one flow-passage line in the configuration using the two flow-passage lines as compared with a case of one flow-passage line causing cooling water to spread over the entirety of the frame main body 2. That is, it is possible to shorten a total length of a flow passage of the plurality of the straight flow passages 8, and the plurality of the first connection flow passages 9, and the plurality of the second connection flow passages 10.

As a result, it is possible to shorten the amount of time the cooling water remains inside the frame main body 2, and it is possible to prevent the cooling water from becoming warmer inside the frame main body 2. Therefore, it is possible to sufficiently cool down the entirety of the frame main body 2 by the cooling water. Since the entirety of the frame main body 2 is sufficiently cooled down, the stator fitted onto the inner-peripheral surface of the frame main body 2 is cooled down.

As described above, the frame main body 2 according to the above-mentioned rotating electric machine cooling frame 1 includes the two flow-passage lines (a first flow-passage line R1 and a second flow-passage line R2). Consequently, it is possible to shorten the total distance of the flow passages per one flow-passage line, it is possible to shorten the amount of time the cooling water remains inside the frame main body 2, and it is possible to prevent the cooling water from becoming warmer. Thus, it is possible to sufficiently cool down the entirety of the frame main body 2 by the cooling water while suppressing temperature irregularity.

Additionally, the branch flow passage 11 is formed at the base end 3c of the water inlet 3. The converging flow passage 12 is formed at the base end 4c of the water outlet 4. For this reason, the cooling water supplied to the water inlet 3 is immediately branched and flows to each of the first flow-passage line R1 and the second flow-passage line R2. The cooling water spreads over the entirety of the frame main body 2 without converging until the cooling water reaches just before the water outlet 4. Therefore, it is possible to further reduce temperature irregularity of the cooling water spreading over the entirety of the frame main body 2.

Moreover, the branch flow passage 11 is on the same plane as that of the first connection flow passage 9 disposed at the water inlet 3. The converging flow passage 12 is on the same plane as that of the first connection flow passage 9 disposed at the water outlet 4. Consequently, the cooling water supplied to the water inlet 3 is immediately branched to the two first connection flow passages 9, and flows to each of the first flow-passage line R1 and the second flow-passage line R2. Accordingly, the cooling water cooled down as much as possible can be supplied to each of the first flow-passage line R1 and the second flow-passage line R2.

In other words, in a case in which a distance to travel from the water inlet 3 to each of the first flow-passage line R1 and the second flow-passage line R2 is longer, there is a possibility that the branched cooling water becomes warmer. In contrast, since water is supplied to each of the first flow-passage line R1 and the second flow-passage line R2, which is connected to just below the water inlet 3 (base end 3c), the cooling water in a state of being cooled down is spread to each of the first flow-passage line R1 and the second flow-passage line R2.

Furthermore, the water inlet 3 and the water outlet 4 are disposed to face each other so as to sandwich a central axis C of the frame main body 2. Consequently, the length of the first flow-passage line R1 can be the same as the length of the second flow-passage line R2. Therefore, it is possible to reduce temperature irregularity of the water of each of the first flow-passage line R1 and the second flow-passage line R2, and it is possible to uniformly cool down the entirety of the frame main body 2.

Moreover, the water inlet 3 and the water outlet 4 are disposed on the same edge surface (on the first end portion 2a in the axial direction) in the axial direction of the frame main body 2. Because of this, it is possible to collectively lead a pipe, a hose pipe, or the like (not shown in the drawings) which is to be connected to the water inlet 3 or the water outlet 4. Therefore, flexibility in layout design of the rotating electric machine cooling frame 1 can be improved.

Moreover, a plurality of holes 6 are formed on the first end portion 2a of the frame main body 2 in the axial direction. As described in the embodiment, the holes 6 can be utilized to remove the core 20 in the case of manufacturing the rotating electric machine cooling frame 1 by casting. In addition, the holes 6 can be utilized as holes for positioning of the core 20. As stated above, it is possible to provide two functions to the holes 6.

Also, as well as the holes 6, the opening portion 3b of the water inlet 3 or the opening portion 4b of the water outlet 4 can be utilized as holes for removing the core 20.

Furthermore, the water flow passages 5 are formed over the entirety of the frame main body 2 while meandering so as to be turned back at both ends of the frame main body 2 in the axial direction. Consequently, it is possible to cause the cooling water to evenly spread over the entirety of the frame main body 2, and it is possible to uniformly cool down the entirety of the frame main body 2.

Moreover, the method of manufacturing the rotating electric machine cooling frame 1 includes: the core-manufacturing step, the core placement step, the frame-manufacturing step, and the core removal step. Therefore, it is possible to easily form the water flow passage 5 inside the frame main body 2 by use of the core 20 without the need for machining.

Additionally, a sand mold is used as the core 20. In the core removal step, the rough crushing step, the first blowing step, the heating step, and the second blowing step are carried out. Consequently, it is possible to reliably remove the core 20 from the frame main body 2.

The core 20 has the projecting portions 21. By the projecting portions 21, the holes 6 are formed on the frame main body 2 and the position of the core 20 is fixed in a mold, which is not shown in the drawings. Consequently, by the projecting portions 21, the positioning of the core 20 can be easily carried out inside the mold, and it is possible to easily remove the core 20 from the frame main body 2.

The projecting portion 21 is formed at the position corresponding to the first connection flow passage 9 of the core 20. That is, the plurality of the projecting portions 21 are formed only on one end of the entirety of the core 20 in the axial direction. Thus, since the holes 6 are not formed on both ends of the frame main body 2 in the axial direction, it is not necessary to change the direction of the frame main body 2 when attaching the caps 7. Accordingly, it is possible to improve workability of an operation of attaching the caps 7. Additionally, the sand mold for forming the core 20 can be simplified as much as possible, and it is possible to reduce the cost of manufacturing the core 20 as much as possible.

Modified Example

Note that, in the water flow passage 5 according to the aforementioned embodiment, a distance between the straight flow passages 8 in the circumferential direction can be optionally set. A distance between the straight flow passages 8 adjacent to each other in the circumferential direction may be wide or may be narrow. It is sufficient if the lengths of the first connection flow passage 9, the second connection flow passage 10, the branch flow passage 11, and the converging flow passage 12 in the circumferential direction are changed depending on a distance between the straight flow passages 8 adjacent to each other in the circumferential direction.

In the above-mentioned embodiment, a case was described in which the water inlet 3 and the water outlet 4 are integrally molded on the first end portion 2a of the frame main body 2 in the axial direction. A case was described in which the opening portions 3b and 4b formed at the front-ends 3a and 4a of the water inlet 3 and the water outlet 4, respectively, face the same direction. However, the embodiment is not limited to this configuration. The water inlet 3 and the water outlet 4 may be disposed at the respective edge surfaces of the frame main body 2 which are on the opposite sides to each other in the axial direction. The opening portions 3b and 4b may not face the same direction.

With this configuration, the drawing direction of a pipe or a hose pipe connected to the water inlet 3 can be different from the drawing direction of a pipe or a hose pipe connected to the water outlet 4. For this reason, the pipe or the hose pipe connected to the water inlet 3 can be separated from the pipe or the hose pipe connected to the water outlet 4 as much as possible. As a result, direct heat exchange between the pipe or the hose pipe connected to the water inlet 3 and the pipe or the hose pipe connected to the water outlet 4 can be prevented, and it is possible to further reliably cool down the frame main body 2.

In the above-described embodiment, a case was described in which the water inlet 3 and the water outlet 4 are disposed to face each other so as to sandwich a central axis C of the frame main body 2. However, the embodiment is not limited to this configuration. The water inlet 3 and the water outlet 4 may be disposed at a position shifted in the axial direction. With this configuration, flexibility in layout design of the water inlet 3 and the water outlet 4 can be improved.

In the aforementioned embodiment, a case was described in which the cooling water is used as a cooling medium. However, the embodiment is not limited to this configuration. Fluid other than cooling water may be used as a cooling medium. For example, by using oil, air, or the like as a cooling medium, the frame main body 2 may be cooled down.

In the above-mentioned embodiment, a case was described in which the water flow passage 5 includes the first flow-passage line R1 and the second flow-passage line R2. However, the embodiment is not limited to this configuration. As long as the water inlet 3 and the water outlet 4 are provided at the frame main body 2 one by one, the number of flow-passage lines may be greater than or equal to three.

In the above-described embodiment, a case was described in which the shape of the frame main body 2 is circular-cylindrical. However, the embodiment is not limited to this configuration. It is sufficient if a shape of the frame main body 2 is a tube shape, and a shape of the frame main body 2 may be changed depending on an outer shape of a stator, which is not shown in the drawings. For example, the frame main body 2 may be formed in a polygonal tube shape.

In the aforementioned embodiment, a case was described in which the frame main body 2 is made of, for example, an aluminum alloy, by casting. However, the embodiment is not limited to this configuration. As long as a metal having thermal conductivity is employed, the frame main body 2 may be made of a variety of metals, by casting.

In the above-mentioned method of manufacturing the rotating electric machine cooling frame 1 according to the embodiment, a case was described in which the water flow passage 5 is formed by use of the sand mold core 20. However, the embodiment is not limited to this configuration. It is sufficient if the core 20 is removed after the frame main body 2 is cast. For example, the water flow passage 5 may be formed by use of a lost wax method.

Figure 3:
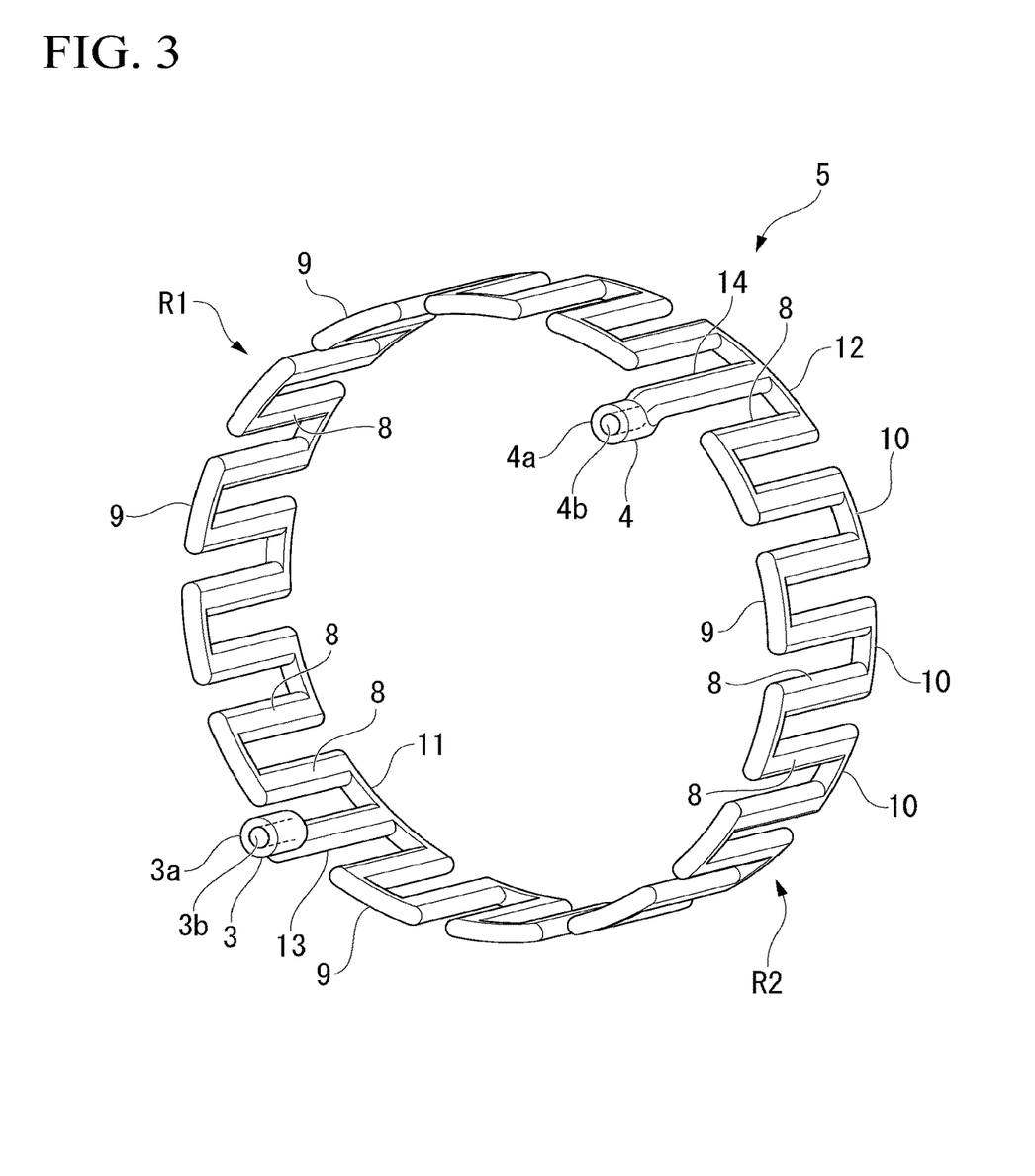
FIG. 3 is a perspective view showing a water flow passage according to a first modified example of the embodiment.

FIG. 3 is a perspective view showing a water flow passage 5 according to a first modified example.

In the above-mentioned embodiment, a case was described in which the branch flow passage 11 is on the same plane as the first connection flow passage 9 disposed on the water inlet 3 and the converging flow passage 12 is on the same plane as the first connection flow passage 9 disposed at the water outlet 4. Furthermore, a case was described in which the branch flow passage 11 is formed at the base end 3c of the water inlet 3. Additionally, a case was described in which the converging flow passage 12 is formed at the base end 4c of the water outlet 4.

However, the embodiment is not limited to this configuration. As shown in FIG. 3, the branch flow passage 11 may be disposed on the same plane as the second connection flow passage 10 on the opposite side of the water inlet 3, and the converging flow passage 12 may be disposed on the same plane as the second connection flow passage 10 on the opposite side of the water outlet 4. In this case, the water inlet 3 is in communication with the branch flow passage 11 by a first extension flow passage 13. Moreover, the water outlet 4 is in communication with the converging flow passage 12 by a second extension flow passage 14.

The shape of each of the first connection flow passage 9 and the second connection flow passage 10 according to the first modified example is slightly different from the shape of each of the first connection flow passage 9 and the second connection flow passage 10 according to the above-described embodiment. That is, the first connection flow passage 9 and the second connection flow passage 10 according to the first modified example extend substantially straight in the circumferential direction. As stated above, the shape of the water flow passage 5 (each of the flow passages 8 to 12) may be optionally selected.

Thus, according to the first modified example, the same or similar effects as those of the above-described embodiment are obtained.

Figure 4:
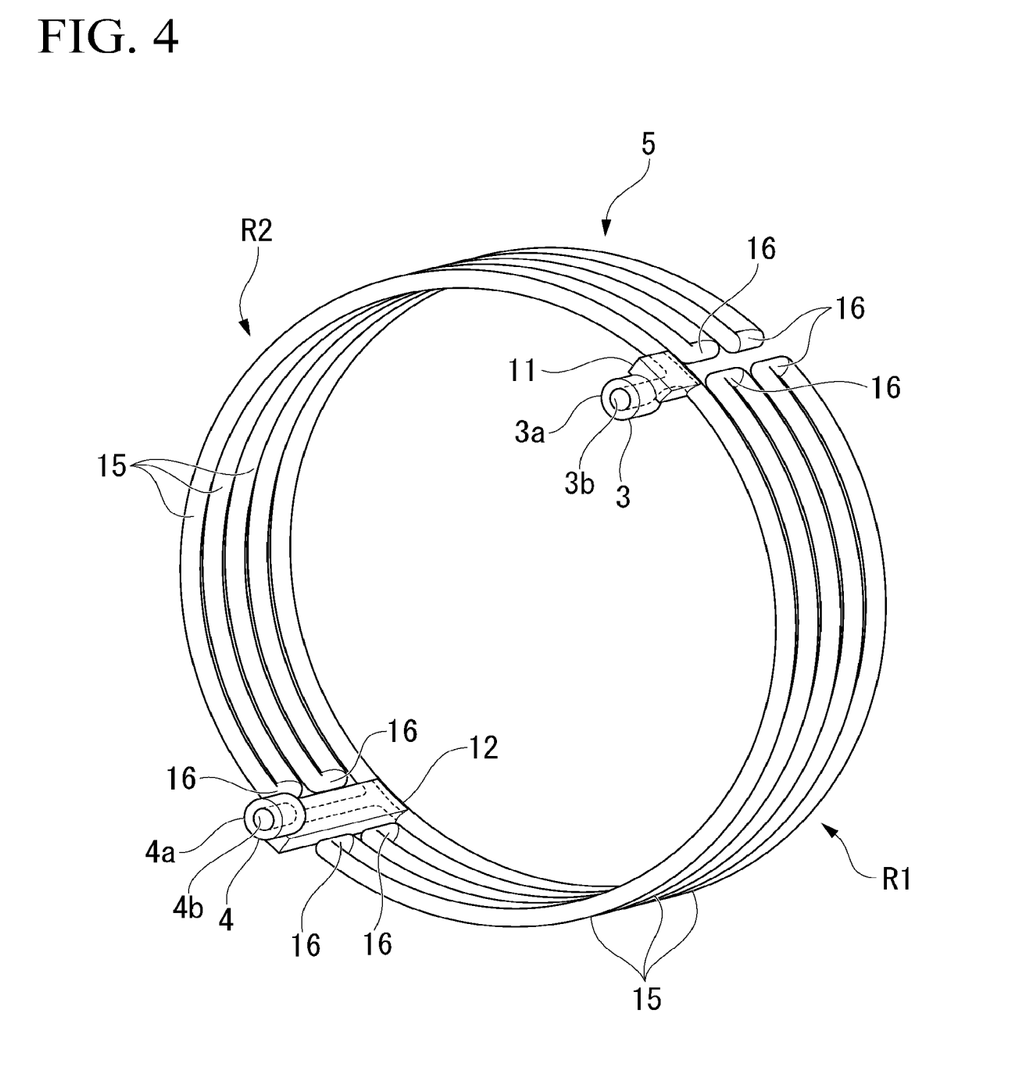
FIG. 4 is a perspective view showing a water flow passage according to a second modified example of the embodiment.

FIG. 4 is a perspective view showing a water flow passage 5 according to a second modified example.

In the above-described embodiment, a case was described in which the water flow passage 5 is formed over the entirety of the frame main body 2 while meandering so as to be turned back at both ends of the frame main body 2 in the axial direction. However, the embodiment is not limited to this configuration. As shown in FIG. 4, the water flow passage 5 may be led while meandering from the first end portion 2a of the frame main body 2 in the axial direction toward the second end portion 2b (refer to FIG. 1) in the axial direction.

More specifically, the water flow passage 5 branches into two flow passages from the water inlet 3 via the branch flow passage 11. Each of the two flow passages branched by the branch flow passage 11 includes a plurality of outer-periphery flow passages 15 each extending from the branch flow passage 11 toward the water outlet 4 in the circumferential direction. In the second modified example, for example, each of the branched two flow passages includes five outer-periphery flow passages 15.

In each of the two flow passages branched by the branch flow passage 11, the plurality of the outer-periphery flow passages 15 are arranged side by side in the axial direction. A flow passage end of each of the plurality of the outer-periphery flow passages 15 in the circumferential direction is in communication with a turn-back flow passage 16. The flow passage ends of the two outer-periphery flow passages 15 adjacent to each other are in communication with the turn-back flow passage 16. The turn-back flow passage 16 is located close to the branch flow passage 11 and the converging flow passage 12.

Particularly, the turn-back flow passage 16 located close to the branch flow passage 11 is arranged such that a part of the turn-back flow passage 16 overlaps the branch flow passage 11 when viewed from the axial direction. The turn-back flow passage 16 located close to the converging flow passage 12 faces the converging flow passage 12 in the circumferential direction. In the second modified example, the converging flow passage 12 is a converging flow passage member extending in the axial direction. One end of the converging flow passage member in the axial direction is in communication with the two outer-periphery flow passages 15. The other end of the converging flow passage member in the axial direction is in communication with the water outlet 4.

In each of the two flow passages branched by the branch flow passage 11, of the five outer-periphery flow passages 15, the outer-periphery flow passage 15 furthest from the branch flow passage 11 when viewed from the axial direction is in communication with the converging flow passage 12. That is, the converging flow passage 12 causes the two flow passages branched by the branch flow passage 11 to be combined to the outer-periphery flow passage 15.

Accordingly, each of the two flow passages extending from the water inlet 3 to the water outlet 4 in the circumferential direction meanders in the axial direction so as to be turned back and to have the outer-periphery flow passage 15 having a length corresponding to a half of a circumference of the frame main body 2 when viewed from the axial direction. Consequently, the water flow passage 5 according to the second modified example includes the first flow-passage line R1 and the second flow-passage line R2.

Even in the case of this configuration, the same or similar effects as those of the above-described embodiment are obtained.

According to at least one embodiment described above, the rotating electric machine cooling frame 1 is provided with the water flow passage 5 including the two flow-passage lines (first flow-passage line R1 and second flow-passage line R2). Therefore, it is possible to shorten the total distance of the flow passages per one flow-passage line. Because of this, it is possible to shorten the amount of time the cooling water remains inside the frame main body 2, and it is possible to prevent the cooling water from becoming warmer inside the frame main body 2. As a result, it is possible to sufficiently cool down the entirety of the frame main body 2 by the cooling water while reducing temperature irregularity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

DESCRIPTION OF REFERENCE NUMERALS

1 . . . rotating electric machine cooling frame, 2 . . . frame main body, 3 . . . water inlet (cooling-medium inlet), 4 . . . water outlet (cooling-medium outlet), 5 . . . water flow passage (cooling-medium flow passage), 6 . . . hole, 8 . . . straight flow passage (cooling-medium flow passage), 9 . . . first connection flow passage (cooling-medium flow passage), 10 . . . second connection flow passage (cooling-medium flow passage), 11 . . . branch flow passage (cooling-medium flow passage), 12 . . . converging flow passage (cooling-medium flow passage), 13 . . . first extension flow passage (cooling-medium flow passage), 14 . . . second extension flow passage (cooling-medium flow passage), 15 . . . outer-periphery flow passage (cooling-medium flow passage), 16 . . . turn-back flow passage (cooling-medium flow passage), 20 . . . core, 21 . . . projecting portion, R1 . . . first flow-passage line, R2 . . . second flow-passage line

The invention claimed is:
1. A rotating electric machine cooling frame, comprising:
a cylindrical frame main body;
one cooling-medium inlet provided on the frame main body;
one cooling-medium outlet provided on the frame main body; and
two flow-passage lines provided in the frame main body, including
a cooling-medium flow passage in communication with the cooling-medium inlet and the cooling-medium outlet,
a branch flow passage formed at a connection portion between the cooling-medium inlet and the cooling-medium flow passage; and
a converging flow passage formed at a connection portion between the cooling-medium outlet and the cooling-medium flow passage, wherein
the branch flow passage is disposed at a position close to an edge surface of the frame main body in an axial direction and at a position directly under the cooling-medium inlet.
2. The rotating electric machine cooling frame according to claim 1, wherein
the cooling-medium inlet and the cooling-medium outlet are disposed to face each other so as to sandwich a center of the frame main body in a radial direction therebetween.

3. The rotating electric machine cooling frame according to claim 1, wherein
the cooling-medium inlet and the cooling-medium outlet are disposed on a same edge surface of the frame main body in an axial direction.

4. The rotating electric machine cooling frame according to claim 1, wherein
a plurality of holes are provided which are formed on one end surface of the frame main body in an axial direction and are in communication with the cooling-medium flow passage.

5. The rotating electric machine cooling frame according to claim 1, wherein
the cooling-medium flow passage meanders so as to be turned back at both ends of the frame main body in an axial direction.

* * * * *